(12) United States Patent
Motwani et al.

(10) Patent No.: US 10,547,615 B2
(45) Date of Patent: Jan. 28, 2020

(54) SECURITY RESPONSE PROTOCOL BASED ON SECURITY ALERT ENCODED DATA SLICES OF A DISTRIBUTED STORAGE NETWORK

(71) Applicant: International Business Machines Corporation, Armonk, NY (US)

(72) Inventors: Manish Motwani, Chicago, IL (US); Brian F. Ober, Lake in the Hills, IL (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 187 days.

(21) Appl. No.: 15/262,651

(22) Filed: Sep. 12, 2016

(65) Prior Publication Data

US 2018/0077159 A1  Mar. 15, 2018

(51) Int. Cl.
    *H04L 29/06* (2006.01)
(52) U.S. Cl.
    CPC ............ *H04L 63/10* (2013.01); *H04L 63/101* (2013.01); *H04L 63/102* (2013.01); *H04L 63/1416* (2013.01); *H04L 63/1441* (2013.01); *H04L 63/308* (2013.01)
(58) Field of Classification Search
    CPC ..... H04L 63/10; H04L 63/101; H04L 63/102; H04L 63/1416; H04L 63/1441; H04L 63/308; H04L 63/08; H04N 21/47; G06F 11/076; G06F 11/0727
    USPC .......................... 725/25, 38; 726/2–5, 14, 23
    See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Shanto Abedin
(74) *Attorney, Agent, or Firm* — Garlick & Markison; Timothy W. Markison; Patricia A. Markison

(57) ABSTRACT

A method includes receiving, from a requesting device, an access request for at least one security alert encoded data slice of a set of security alert encoded data slices. A security alert message is dispersed storage error encoded into the set of security alert encoded data slices and stored in a set of storage units of a dispersed storage network (DSN). The set of storage units further stores a plurality of sets of encoded data slices, which corresponds to a data object that is dispersed storage error encoded. The method further includes, based on the access request for the at least one security alert encoded data slice, identifying the requesting device as an unauthorized DSN device. The method further includes initiating a security response protocol within the DSN.

18 Claims, 7 Drawing Sheets

(56) References Cited

U.S. PATENT DOCUMENTS

| | | | |
|---|---|---|---|
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,346,924 B2* | 3/2008 | Miyawaki | H04L 29/12066 713/150 |
| 7,636,724 B2 | 12/2009 | de la Torre et al. | |
| 2002/0062422 A1 | 5/2002 | Butterworth et al. | |
| 2002/0133491 A1* | 9/2002 | Sim | G06F 17/30067 |
| 2002/0166079 A1 | 11/2002 | Ulrich et al. | |
| 2003/0018927 A1 | 1/2003 | Gadir et al. | |
| 2003/0037261 A1* | 2/2003 | Meffert | G06F 21/10 726/5 |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2011/0055903 A1* | 3/2011 | Leggette | G06F 11/1004 726/4 |
| 2011/0078774 A1* | 3/2011 | Grube | G06F 11/1076 726/5 |
| 2011/0125999 A1* | 5/2011 | Cilfone | G06F 3/0617 713/150 |
| 2012/0030371 A1* | 2/2012 | Baptist | H04L 63/08 709/236 |
| 2013/0125169 A1* | 5/2013 | Barton | G11B 20/0021 725/38 |
| 2013/0138862 A1* | 5/2013 | Motwani | H04L 65/10 711/5 |
| 2013/0283094 A1* | 10/2013 | Baptist | H04L 67/1097 714/6.2 |
| 2014/0351891 A1* | 11/2014 | Grube | G06F 11/0727 726/3 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

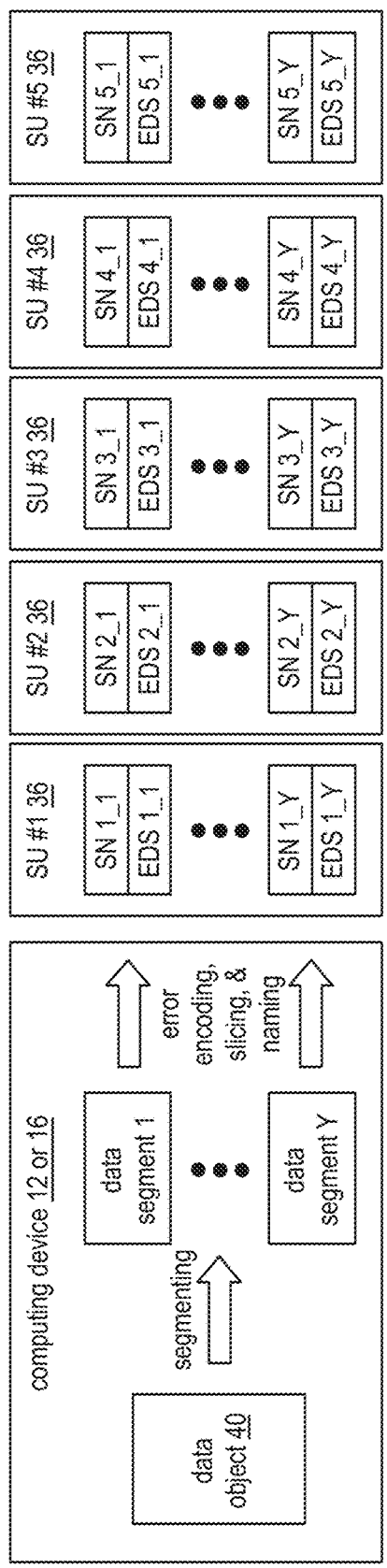
FIG. 3
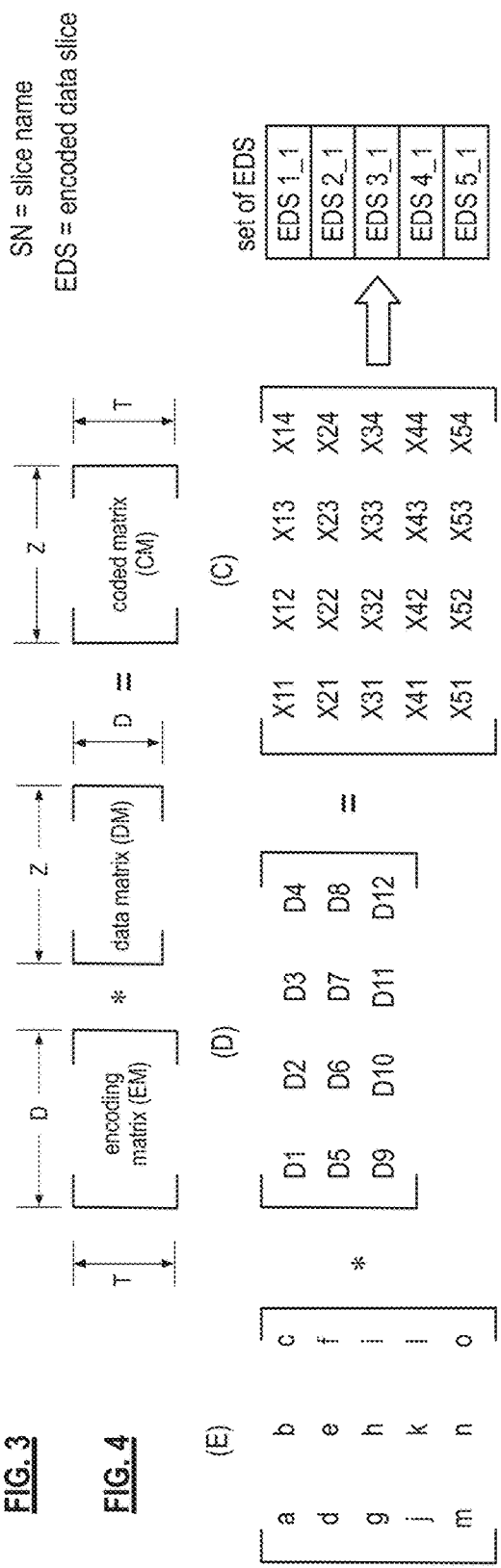
FIG. 4
FIG. 5
FIG. 6

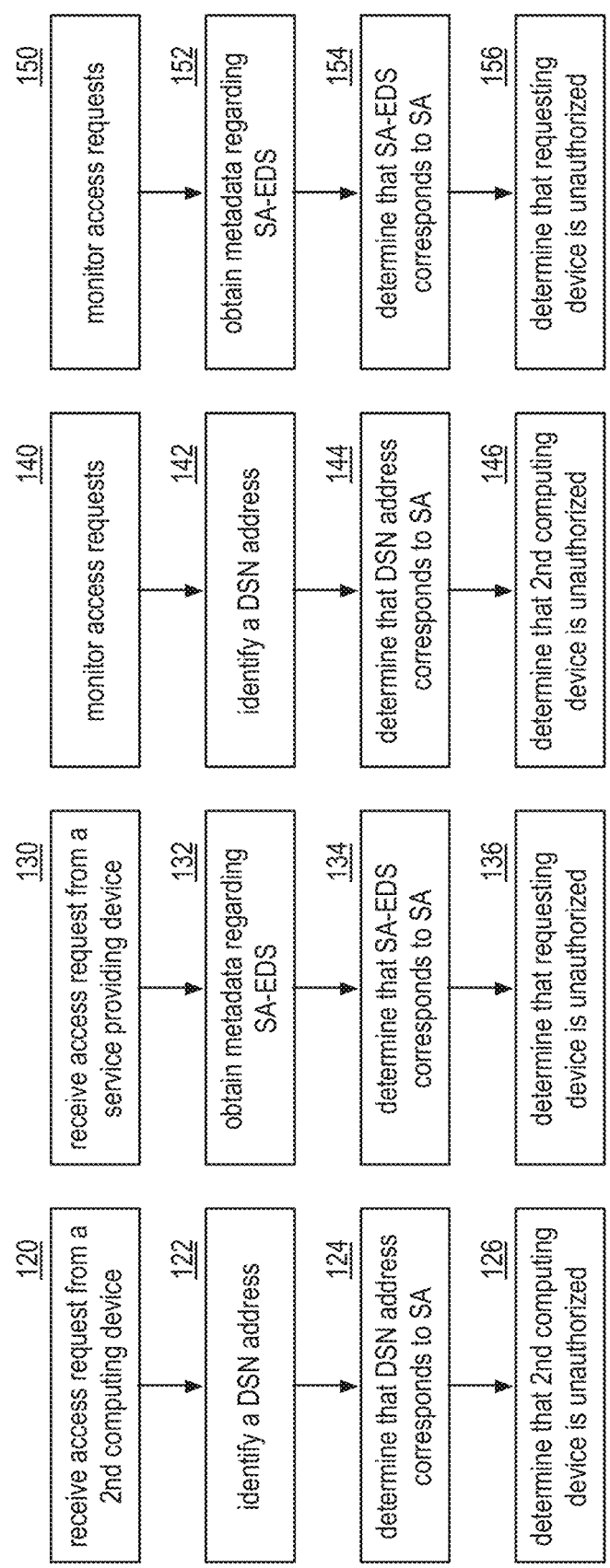

SECURITY RESPONSE PROTOCOL BASED ON SECURITY ALERT ENCODED DATA SLICES OF A DISTRIBUTED STORAGE NETWORK

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 12 is a logic diagram of another example of identifying a requesting device as an unauthorized DSN device in accordance with the present invention;

FIG. 13 is a logic diagram of another example of identifying a requesting device as an unauthorized DSN device in accordance with the present invention;

FIG. 14 is a logic diagram of another example of identifying a requesting device as an unauthorized DSN device in accordance with the present invention; and FIG. 15 is a logic diagram of another example of identifying a requesting device as an unauthorized DSN device in accordance with the present invention.

DETAILED DESCRIPTION OF THE INVENTION

Figure 1:
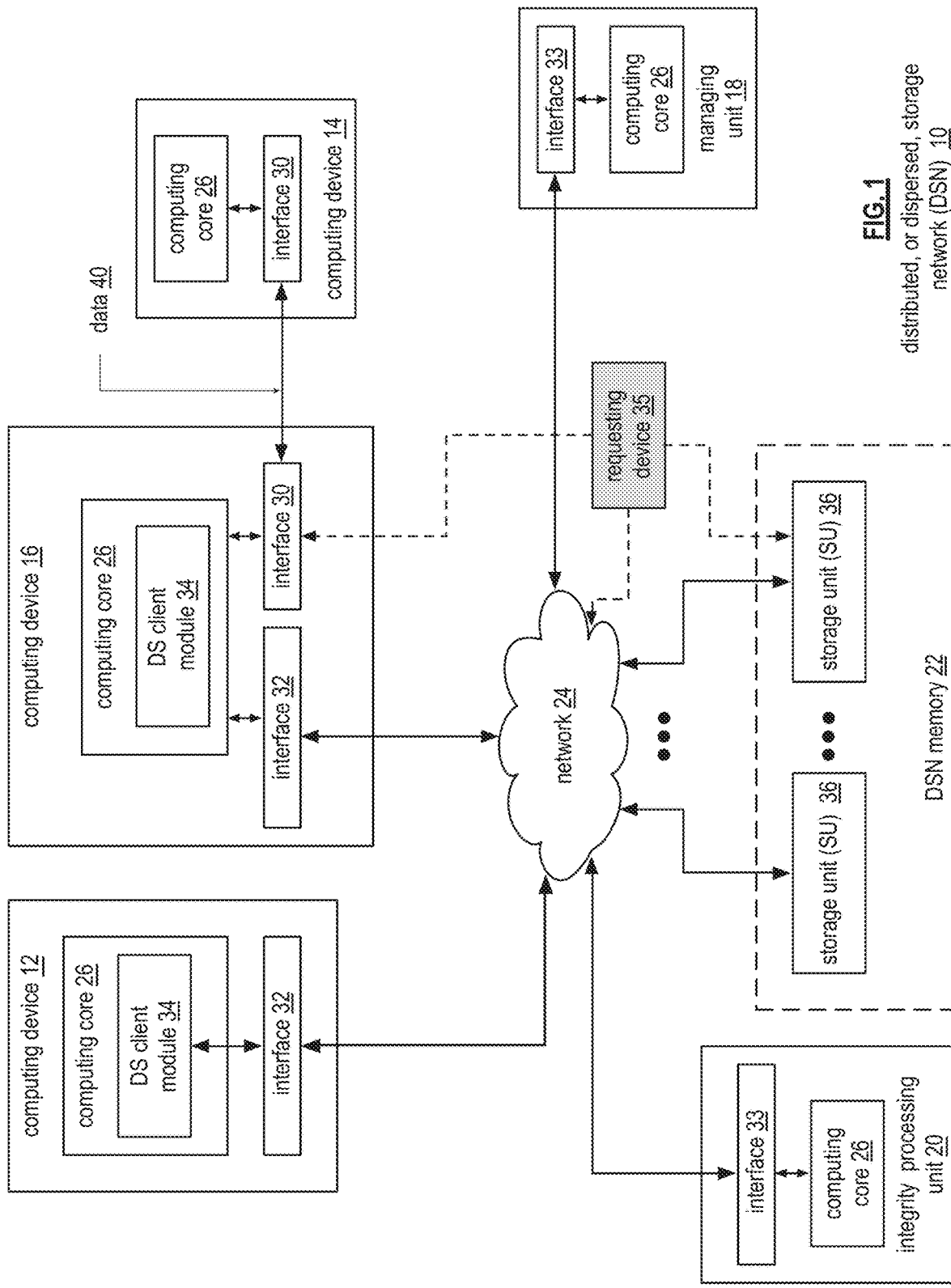
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The DSN may also include a requesting device 35 that attempts to gain access to the DSN. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
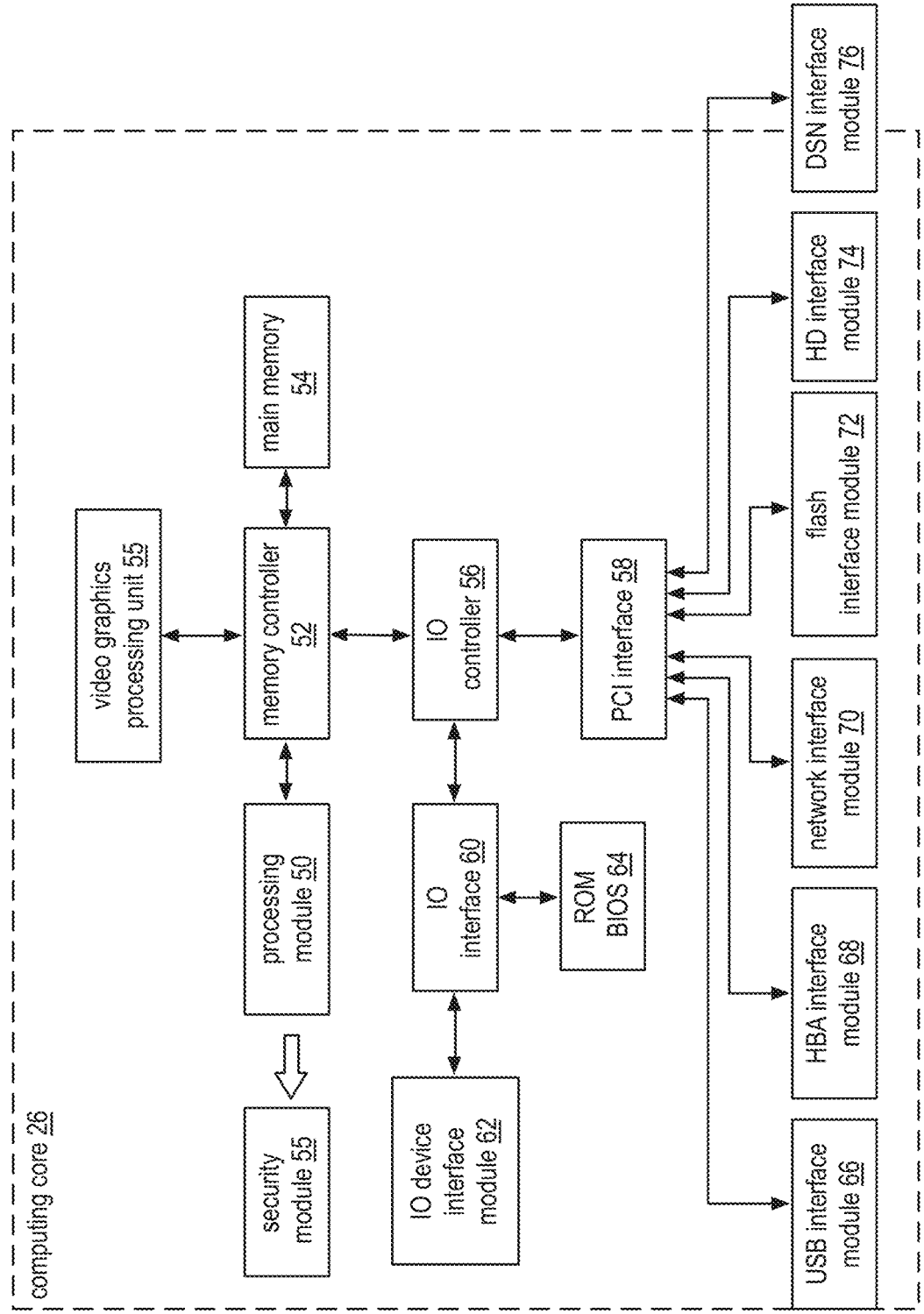
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

The DSN may also include a requesting device 35 that may attempt to gain access to the DSN by impersonating the computing devices 14-16 or by directly accessing one or more of the storage units (SU) 36. In order to detect unauthorized requesting devices, a security alert message is dispersed storage error encoded into the set of security alert encoded data slices and stored in a set of storage units of the DSN along with the plurality of sets of encoded data slices. The security alert encoded data slices are stored in such a way that an authorized DSN device would never request access to security alert encoded data slices. Therefore, a DSN computing device or storage unit that receives an access request from the requesting device 35 can determine whether the requesting device is authorized or unauthorized (i.e., is impersonating the computing devices 14-16, or is not authorized to directly access one or more of the storage units 36) by detecting whether the access request includes the at least one security alert encoded data slice. When the at least one security alert encoded data slice is detected, the DSN device may initiate a security response protocol. The storage of security alert encoded data slices is subsequently described in more detail with reference to FIG. 9. The security response protocol is subsequently described in more detail with reference to one or more of FIGS. 11-15.

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a security module 55, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

The security module 55 functions to store one or more sets of security alert encoded data slices in one or more sets of storage units along with one or more sets of encoded data slices within one or more DSN address ranges. The storage of security alert encoded data slices is subsequently described in more detail with reference to FIG. 9. The security module 55 further functions to monitor access requests between computing devices or between a computing device and a storage unit of the DSN in order to determine whether the access request was sent by an unauthorized requesting device posing as an authorized DSN device. The security module 55 further functions to generate security tracking information based on the level of security threat posed by an unauthorized requesting device. The monitoring of access requests, the determination of whether the access request was sent by an unauthorized requesting device, and the generation of security tracking information is subsequently described in more detail with reference to one or more of FIGS. 9-15. Note one or more of the computing devices 12-16, the managing unit 18, the integrity processing unit 20, and/or into one or more of the storage units 36 may include the security module 55.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
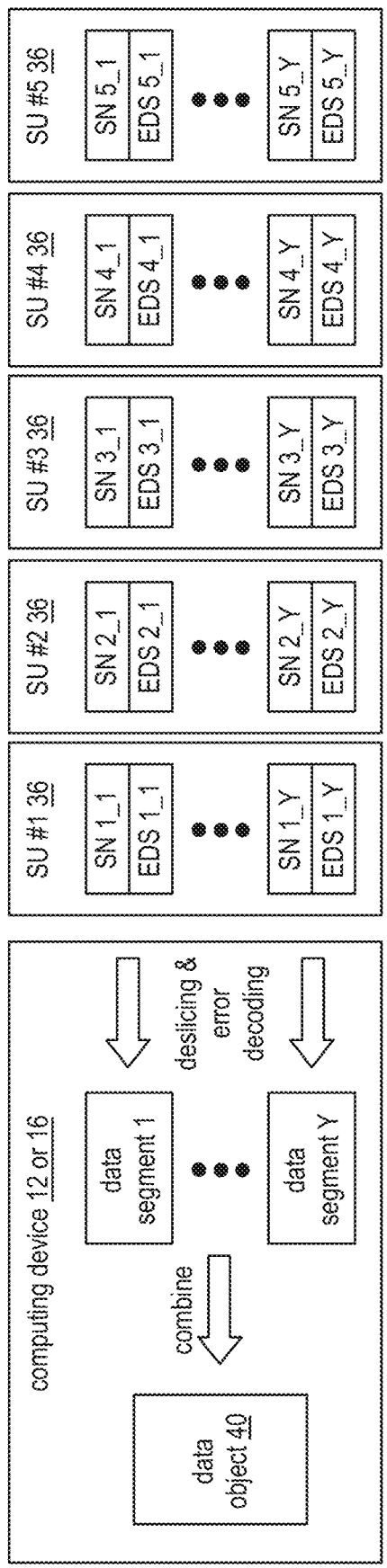
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
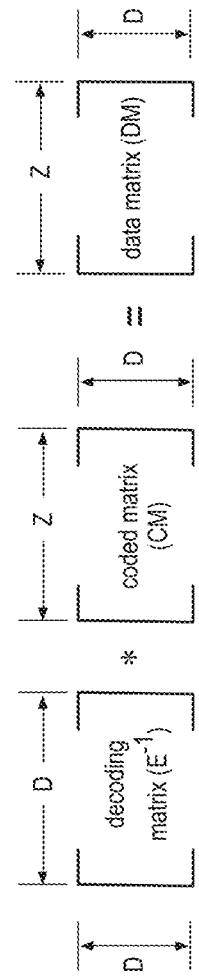
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
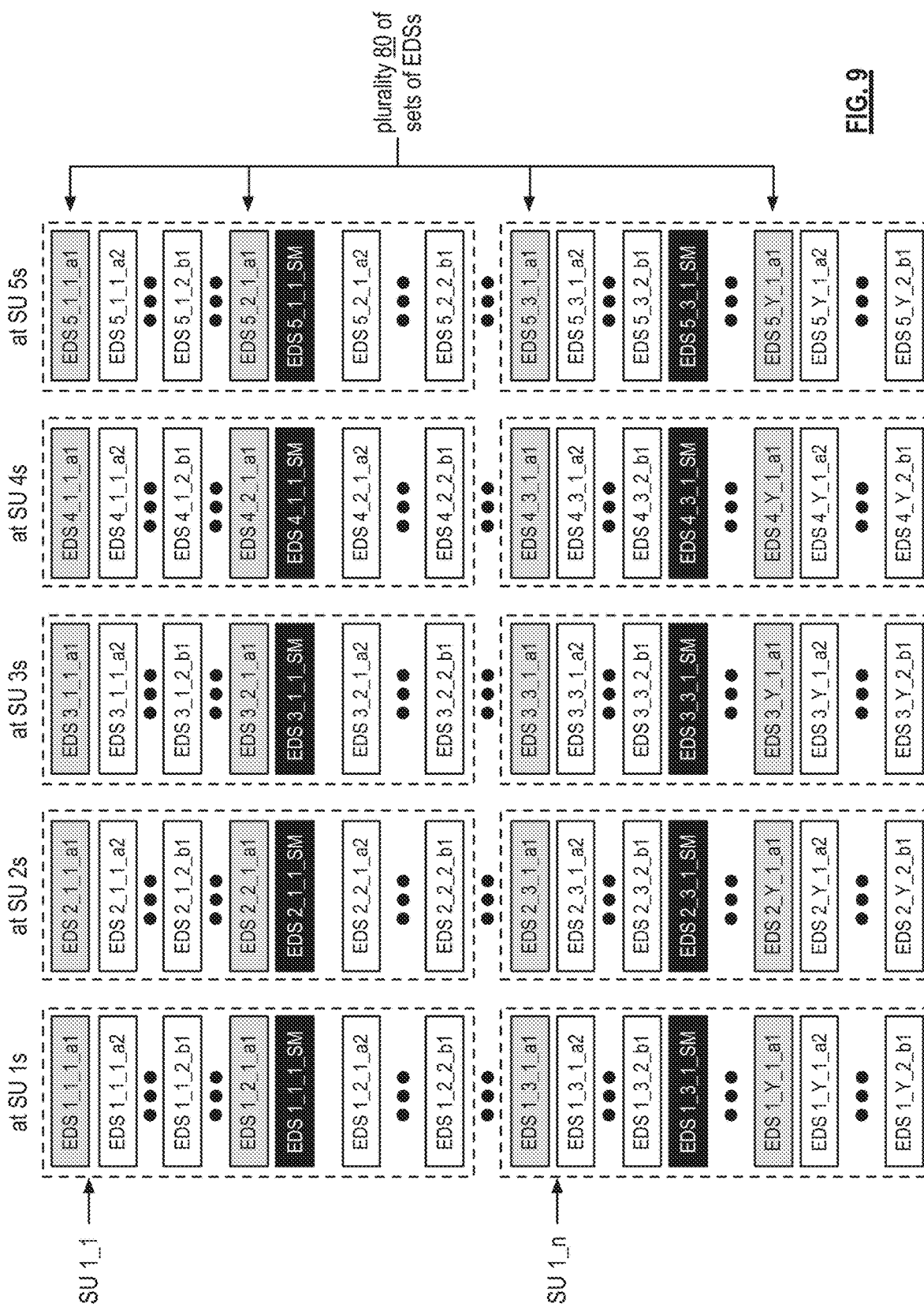
FIG. 9 is a schematic block diagram of an example of storing pluralities of sets of encoded data slices in accordance with the present invention.

FIG. 9 is a schematic block diagram of an example of storing pluralities of sets of slices along with one or more sets of security alert encoded data slices. Each plurality of sets of encoded data slices (EDSs) 80 corresponds to the encoding of a data object, a portion of a data object, or multiple data objects, where a data object is one or more of an audio file, a video file, an image, text, data, digital information, etc. For example, the light gray highlighted plurality of encoded data slices corresponds to a data object having a data identifier of "a1."

Each encoded data slice of each set of encoded data slices is uniquely identified by its slice name, which is also used as at least part of a logical DSN address for storing the encoded data slice. As shown, a set of EDSs includes EDS 1_1_1_a1 through EDS 5_1_1_a1. The EDS number includes pillar number, data segment number, vault ID, and data object ID. Thus, for EDS 1_1_1_a1, it is the first EDS of a first data segment of data object "a1" and is to be stored, or is stored, in vault 1.

The first column corresponds to one or more storage units having a designation of SU #1 in their respective storage pool or set of storage units and stores encoded data slices having a pillar number of 1. The second column corresponds to one or more storage units having a designation of SU #2 in their respective storage pool or set of storage units and stores encoded data slices having a pillar number of 2, and so on. Each column of EDSs is divided into one or more groups of EDSs. The delineation of a group of EDSs may correspond to a storage unit, to one or more memory devices within a storage unit, multiple storage units, and/or a combination thereof. Note that the grouping of EDSs allows for bulk addressing, which reduces network traffic.

A range of encoded data slices (EDSs) spans a portion of a group, spans a group, or spans multiple groups. The range may be numerical range of slice names regarding the EDSs, one or more source names (e.g., common aspect shared by multiple slice names), a sequence of slice names, or other slice selection criteria.

In addition to storing a plurality of sets of encoded data slices, the DSN storage units also store one or more sets of security alert encoded data slices. A set of security alert encoded data slices is created by dispersed storage error encoded a security alert message. The black highlighted set of security alert encoded data slices corresponds to a security message "SM." Like the plurality of sets of encoded data slices, each security alert encoded data slice of each set of security alert encoded data slices is uniquely identified by its slice name, which is also used as at least part of a logical DSN address for storing the security alert encoded data slice. The security alert encoded data slice (SA-EDS) number includes pillar number, data segment number, vault ID, and security message ID. Thus, for security alert EDS 1_1_1_SM, it is the first security alert EDS of the first data segment of the security message and is to be stored, or is stored, in vault 1 along with encoded data slices within that DSN address range.

The storage of the security message is unknown, or may be known, to authorized user and service providing computing devices of the DSN. Whether known or unknown, no authorized computing device should request access to the encoded data slices of a security message. As such, when a data access request includes a slice name for an encoded data slice of a security message, the request is most likely coming from an authorized computing device.

Figure 10:
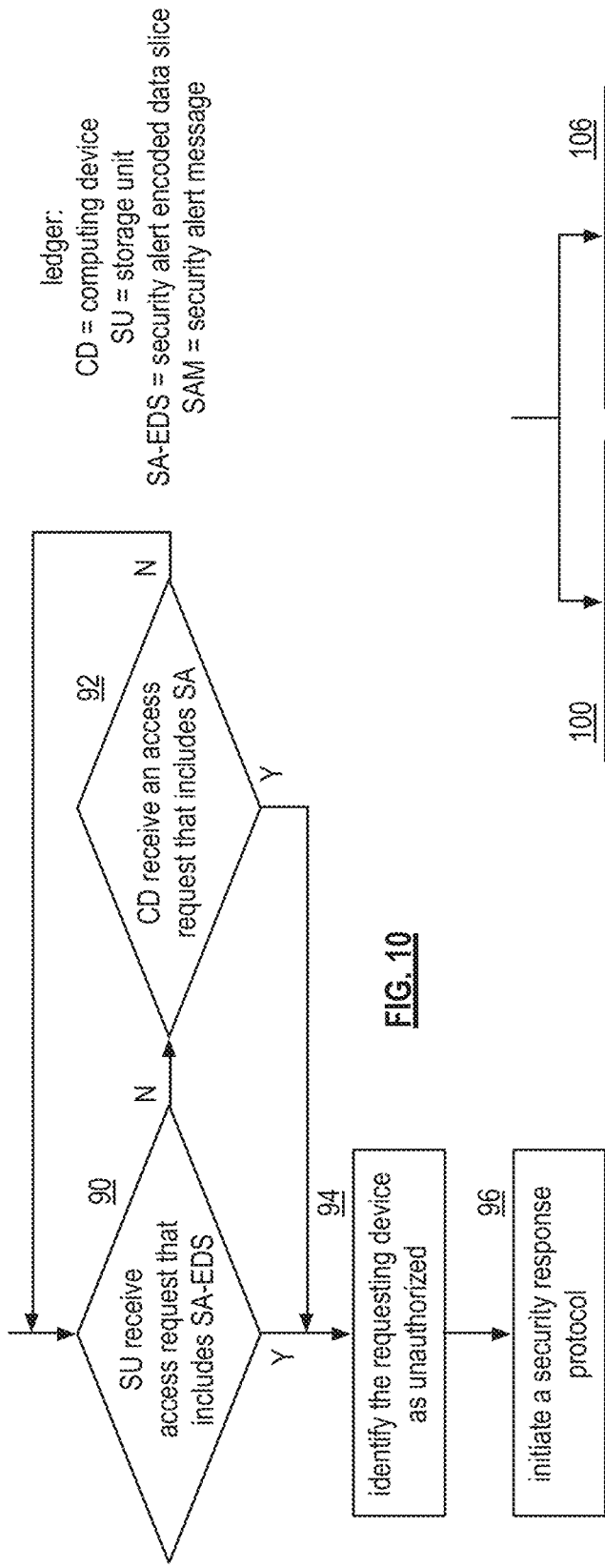
FIG. 10 is a logic diagram of an example of a method of identifying a requesting device as an unauthorized DSN device in accordance with the present invention.

FIG. 10 is a flowchart illustrating an example of identifying a requesting device as an unauthorized DSN device. The method begins with step 90 where a storage device of the DSN determines whether it has received an access request from a requesting device that includes at least one security alert encoded data slice. For instance, a security alert message (e.g., null data, random data, a specific message, etc.) is dispersed storage error encoded into the set of security alert encoded data slices and stored in a set of storage units of the DSN along with pluralities of sets of encoded data slices. In an example, the access request includes a list request of encoded data slices within a range of DSN addresses and the range includes a slice name for one of the security alert encoded data slices.

If the storage unit within the DSN has not received an access request that includes at least one security alert encoded data slice, the method continues to step 92 where a computing device of the DSN determines whether it has received an access request that includes at least one security alert encoded data slice. As such, either the storage unit or the computing device can determine whether the access request includes a security alert encoded data slice. If neither the storage unit nor the computing device has received an access request that includes at least one security alert encoded data slice, the method goes back to step 90.

When the storage unit or the computing device has received an access request that includes at least one security alert encoded data slice the method continues at step 94 where the device (e.g., the computing device and/or storage unit of the DSN) identifies the requesting device as an unauthorized DSN device. For example, the device identifies the requesting device as an unauthorized DSN device by interpreting metadata associated with the at least one security alert encoded data slice to determine that an authentic DSN device would not request access to the at least one security alert encoded data slice. The metadata associated with the at least one security alert encoded data slice may include a DSN address, a slice name, a source name, and/or other identifying information. The method continues at step 96 where the device initiates a security response protocol within the DSN. The security response protocol includes one or more of: denying the access request, denying the requesting device further access to a DSN vault in which the plurality of sets of encoded data slices is stored, banning the requesting device from accessing the DSN, and directing the access request to a special DSN vault. When the access request is directed to a special DSN vault, arbitrary data is returned to the requesting device so that the device may determine a level of security threat posed by the requesting device based on the requesting device's activity in the special DSN vault. The device will then generate security tracking information based on the level of security threat posed by the requesting device. For example, if the requesting device is requesting large amounts of data in the special DSN vault, the device determines that the requesting device's activity poses a high level security threat to the DSN. In response, the device generates appropriate security tracking information so that the requesting entity is flagged as a high security threat device. Such security tracking information includes creating an audit log containing the requesting device ID, the requesting device's user ID, the time of the data access request, the duration of the data access request, the manner of the data access, information regarding the data being accessed, location information of requesting device, and/or routing of data information.

Figure 11:
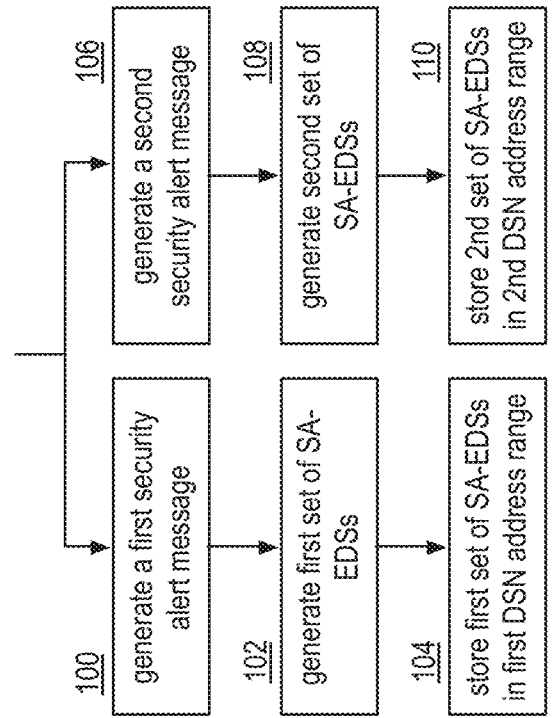
FIG. 11 is a logic diagram of an example of generating and storing sets of security alert encoded data slices in accordance with the present invention.

FIG. 11 is a flowchart illustrating an example of generating and storing sets of security alert encoded data slices. The method begins with step 100 where a security module of the DSN generates a security alert message. The method continues with step 102 where the security module generates a first set of security alert encoded data slices by disperse storage error encoding the security message. The method further continues with step 104 where the security module stores the first set of security alert encoded data slices in the set of storage units within a first DSN address range, where the set of storage units further stores first pluralities of sets of encoded data slices within the first DSN address range.

The method includes step 106 where the security module generates a second security alert message. The method continues with step 108 where the security module generates a second set of security alert encoded data slices by disperse storage error encoding the second security message. The method further continues with step 110 where the security module stores the second set of security alert encoded data slices in the set of storage units within a second DSN address range, where the set of storage units further stores second pluralities of sets of encoded data slices within the second DSN address range.

FIG. 12 is a flowchart illustrating another example of identifying a requesting device as an unauthorized DSN entity. The method begins with step 120 where a computing device of the DSN receives an access request from a second computing device. The method continues with step 122 where the computing device interprets the access request to identify at least one DSN address. The method further continues with step 124 where the computing device determines that the at least one DSN address corresponds to the security alert message. The method further continues with step 126 where the computing device determines that the second computing device is an unauthorized DSN device (e.g., the requesting device is impersonating computing device 14 requesting data access from computing device 16).

FIG. 13 is a flowchart illustrating another example of identifying a requesting device as an unauthorized DSN entity. The method begins with step 130 where a storage unit of the set of storage units of the DSN receives an access request from a requesting device that allegedly provides DSN services for a second computing device. The method continues with step 132 where the storage unit obtains metadata associated with the at least one security alert encoded data slice. The metadata associated with the at least one security alert encoded data slice may include a DSN address, a slice name, a source name, and/or other identifying information. The method further continues with step 134 where the storage unit determines that based on the metadata, that the at least one security alert encoded data slice corresponds to the security alert message. The method further continues with step 136 where the storage unit determines that the requesting device is an unauthorized DSN device (e.g., the requesting device is impersonating a computing device 16 acting as a dispersed storage processing agent for computing device 14).

FIG. 14 is a flowchart illustrating another example of identifying a requesting device as an unauthorized DSN entity. The method begins with step 140 where a security module of the DSN (e.g., the security module may be within one or more of the computing devices 12-16, the managing unit 18, the integrity processing unit 20, and/or into one or more of the storage units 36) monitors an access request transmitted from a second computing device of the DSN to a first computing device of the DSN. The method continues with step 142 where the security module determines at least one DSN address for the at least one security alert encoded data slice. The method further continues with step 144 where the security module determines that the at least one DSN address corresponds to the security alert message. The method further continues with step 146 where the security module determines that the second computing device is an unauthorized DSN device.

FIG. 15 is a flowchart illustrating another example of identifying a requesting device as an unauthorized DSN entity. The method begins with step 150 where a security module of the DSN (e.g., the security module may be within one or more of the computing devices 12-16, the managing unit 18, the integrity processing unit 20, and/or into one or more of the storage units 36) monitors an access request for a first security alert encoded data slice being transmitted from a first computing device to a first storage unit of the set of storage units, where the first computing device provides DSN services for a second computing device (e.g., the requesting device is impersonating a computing device 16 acting as a dispersed storage processing agent for computing device 14).

The method continues with step 152 where the security module obtains metadata associated with the at least one security alert encoded data slice. The metadata associated with the at least one security alert encoded data slice may include a DSN address, a slice name, a source name, and/or other identifying information. The method further continues with step 154 where the security module determines based on the metadata, that the at least one security alert encoded data slice corresponds to the security alert message. The method further continues with step 156 where the security module determines that the first computing device is an unauthorized DSN device.

The security module may also monitor the access request for multiple security alert encoded data slices being transmitted from the first computing device to multiple storage units of the set of storage units. The security module determines a level of security threat posed by the requesting device based on a number of storage units in the multiple storage units. The security module may then generate security tracking information based on the level of security threat posed by the requesting device. For example, the security module may determine a high level security threat is posed by the requesting device when multiple security alert encoded data slices are requested from a large number of storage units in the multiple storage units. The security module may then generate appropriate security tracking information so that the requesting entity is flagged as a high security threat device. Such security tracking information may include creating an audit log including the requesting device ID, the requesting device's user ID, the time of the data access request, the duration of the data access request, the manner of the data access, information regarding the data being accessed, location information of requesting device, and routing of data information.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, nonvolatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a device of a dispersed storage network (DSN), the method comprises:
    receiving, from a requesting device, an access request that includes at least one security alert encoded data slice of a set of security alert encoded data slices, wherein a security alert message is generated by a security module of the DSN, dispersed storage error encoded into the set of security alert encoded data slices and stored in a set of storage units of the DSN, wherein the set of storage units further stores a plurality of sets of encoded data slices, wherein a data object is dispersed storage error encoded into the plurality of sets of encoded data slices; and
    based on the access request for the at least one security alert encoded data slice:
    identifying the requesting device as an unauthorized DSN device, wherein the identifying the requesting device as the unauthorized DSN device includes interpreting metadata associated with the at least one security alert encoded data slice to determine that an authentic DSN device would not request access to the at least one security alert encoded data slice; and
    initiating a security response protocol within the DSN.

2. The method of claim 1 further comprises:
    storing, by the security module of the DSN, the set of security alert encoded data slices in the set of storage units within a first DSN address range, wherein the set of storage units further stores first pluralities of sets of encoded data slices within the first DSN address range;
    generating, by the security module of the DSN, a second security alert message;
    dispersed storage error encoding, by the security module of the DSN, the second security alert message into a second set of security alert encoded data slices; and
    storing, by the security module of the DSN, the second set of security alert encoded data slices in the set of storage units within a second DSN address range, wherein the set of storage units further stores second pluralities of sets of encoded data slices within the second DSN address range.

3. The method of claim 1, wherein the access request comprises:
    a request to access a list of encoded data slices of the plurality of sets of encoded data slices, wherein the list of encoded data slices includes the at least one security alert encoded data slice.

4. The method of claim 1 further comprises:
    receiving, by a computing device of the DSN, the access request from a second computing device;
    interpreting, by the computing device, the access request to identify at least one DSN address;
    determining, by the computing device, that the at least one DSN address corresponds to the security alert message; and
    determining, by the computing device, that the second computing device is an unauthorized DSN device.

5. The method of claim 1 further comprises:
    receiving, by a storage unit of the set of storage units, the access request from the requesting device that allegedly provides DSN services for a second computing device;
    obtaining, by the storage unit, metadata associated with the at least one security alert encoded data slice;

determining, by the storage unit and based on the metadata, that the at least one security alert encoded data slice corresponds to the security alert message; and determining, by the storage unit, that the requesting device is an unauthorized DSN device.

6. The method of claim 1, wherein the security response protocol comprises one or more of:

denying the access request;

denying further access to a DSN vault in which the plurality of sets of encoded data slices is stored;

banning the requesting device from accessing the DSN; and directing the access request to a special DSN vault, wherein, when the access request is directed to the special DSN vault:

returning arbitrary data to the requesting device;

determining a level of security threat posed by the requesting device based on activity in the special DSN vault; and generating security tracking information based on the level of security threat posed by the requesting device.

7. The method of claim 1 further comprises:

monitoring, by the security module of the DSN, the access request for a first security alert encoded data slice being transmitted from a first computing device to a first storage unit of the set of storage units, wherein the first computing device provides DSN services for a second computing device;

obtaining, by the security module, metadata associated with the at least one security alert encoded data slice;

determining, by the security module and based on the metadata, that the at least one security alert encoded data slice corresponds to the security alert message; and determining, by the security module, that the first computing device is an unauthorized DSN device.

8. The method of claim 7 further comprises:

monitoring, by the security module, the access request for multiple security alert encoded data slices being transmitted from the first computing device to multiple storage units of the set of storage units;

determining, by the security module, a level of security threat posed by the requesting device based on a number of storage units in the multiple storage units; and generating, by the security module, security tracking information based on the level of security threat posed by the requesting device.

9. A computer readable memory comprises:

a first memory that stores operational instructions that, when executed by a device of a dispersed storage network (DSN), causes the device to:

receive, from a requesting device, an access request that includes at least one security alert encoded data slice of a set of security alert encoded data slices, wherein a security alert message is generated by a security module of the DSN, dispersed storage error encoded into the set of security alert encoded data slices and stored in a set of storage units of the DSN, wherein the set of storage units further stores a plurality of sets of encoded data slices, wherein a data object is dispersed storage error encoded into the plurality of sets of encoded data slices; and a second memory that stores operational instructions that, when executed by the device, causes the device to:

based on the access request for the at least one security alert encoded data slice:

identify the requesting device as an unauthorized DSN device, wherein the device identifies the requesting device as the unauthorized DSN device by:

interpreting metadata associated with the at least one security alert encoded data slice to determine that an authentic DSN device would not request access to the at least one security alert encoded data slice; and initiate a security response protocol within the DSN.

10. The computer readable memory of claim 9 further comprises:

a third memory that stores operational instructions that, when executed by the security module of the DSN, causes the security module to:

store the set of security alert encoded data slices in the set of storage units within a first DSN address range, wherein the set of storage units further stores first pluralities of sets of encoded data slices within the first DSN address range;

generate a second security alert message;

dispersed storage error encode the second security alert message into a second set of security alert encoded data slices; and store the second set of security alert encoded data slices in the set of storage units within a second DSN address range, wherein the set of storage units further stores second pluralities of sets of encoded data slices within the second DSN address range.

11. The computer readable memory of claim 9, wherein the access request comprises:

a request to access a list of encoded data slices of the plurality of sets of encoded data slices, wherein the list of encoded data slices includes the at least one security alert encoded data slice.

12. The computer readable memory of claim 9, wherein the first memory further stores operational instructions that, when executed by a computing device of the DSN as the device, causes the computing device to:

receive the access request from a second computing device;

interpret the access request to identify at least one DSN address;

determine that the at least one DSN address corresponds to the security alert message; and determine that the second computing device is an unauthorized DSN device.

13. The computer readable memory of claim 9, wherein the first memory further stores operational instructions that, when executed by a storage unit of the set of storage units as the device, causes the storage unit to:

receive the access request for the at least one security alert encoded data slice from a first computing device that provides DSN services for a second computing device;

obtain metadata associated with the at least one security alert encoded data slice;

determine, based on the metadata, that the at least one security alert encoded data slice corresponds to the security alert message; and determine that the first computing device is an unauthorized DSN device.

14. The computer readable memory of claim 9, wherein the security response protocol comprises one or more of:

denying the access request;

denying further access to a DSN vault in which the plurality of sets of encoded data slices is stored;

banning the requesting device from accessing the DSN; and directing the access request to a special DSN vault, wherein, when the access request is directed to the special DSN vault:
returning arbitrary data to the requesting device;
determining a level of security threat posed by the requesting device based on activity in the special DSN vault; and
generating security tracking information based on the level of security threat posed by the requesting device.

15. The computer readable memory of claim 9, wherein the first memory further stores operational instructions that, when executed by the security module of the DSN as the device, causes the security module to:
monitor the access request for a first security alert encoded data slice being transmitted from a first computing device to a first storage unit of the set of storage units, wherein the first computing device provides DSN services for a second computing device;
obtain metadata associated with the at least one security alert encoded data slice;
determine, based on the metadata, that the at least one security alert encoded data slice corresponds to the security alert message; and
determine that the first computing device is an unauthorized DSN device.

16. The computer readable memory of claim 15, wherein the first memory further stores operational instructions that, when executed by a security module of the DSN as the device, causes the security module to:
monitor the access request for multiple security alert encoded data slices being transmitted from the first computing device to multiple storage units of the set of storage units;
determine a level of security threat posed by the requesting device based on a number of storage units in the multiple storage units; and
generate security tracking information based on the level of security threat posed by the requesting device.

17. The method of claim 1 further comprises:
monitoring, by a security module of the DSN, the access request being transmitted from a second computing device of the DSN to a first computing device of the DSN;
determining, by the security module, at least one DSN address for the at least one security alert encoded data slice;
determining, by the security module, that the at least one DSN address corresponds to the security alert message; and
determining, by the security module, that the second computing device is an unauthorized DSN device.

18. The computer readable memory of claim 9, wherein the first memory further stores operational instructions that, when executed by a security module of the DSN as the device, causes the security module to:
monitor the access request for the at least one security alert encoded data slice being transmitted from a second computing device of the DSN to a first computing device of the DSN;
determine at least one DSN address for the at least one security alert encoded data slice;
determine that the at least one DSN address corresponds to the security alert message; and
determine that the second computing device is an unauthorized DSN device.

* * * * *